United States Patent [19]

Barrett

[11] Patent Number: 4,685,000
[45] Date of Patent: Aug. 4, 1987

[54] INHIBITION OF EXPOSURE IN A VIDEO PRINTER UPON LOSS OF COLOR FILTER SYNC

[75] Inventor: Harold J. Barrett, Rochester, N.Y.

[73] Assignee: Eastman Kodak Company, Rochester, N.Y.

[21] Appl. No.: 776,234

[22] Filed: Sep. 16, 1985

[51] Int. Cl.$^4$ .............................................. H04N 5/84
[52] U.S. Cl. .................................. 358/332; 358/244; 358/244.1; 358/76
[58] Field of Search .................. 358/244, 244.1, 244.2, 358/332, 76-80, 345

[56] References Cited

U.S. PATENT DOCUMENTS

| | | | |
|---|---|---|---|
| 2,878,309 | 3/1959 | Christensen | 178/5.4 |
| 3,006,260 | 10/1961 | Smith et al. | 95/12 |
| 3,786,182 | 1/1974 | Kaneko et al. | 358/244 |
| 4,161,749 | 7/1979 | Erlichman | 358/75 |
| 4,262,301 | 4/1981 | Erlichman | 358/76 |
| 4,275,959 | 6/1981 | Jones | 355/20 |
| 4,339,697 | 7/1982 | Fujita et al. | 358/6 |
| 4,340,905 | 7/1982 | Balding | 358/80 |
| 4,373,156 | 2/1983 | Pfannkuch et al. | 340/703 |
| 4,394,089 | 7/1983 | McIntosh et al. | 355/88 |
| 4,462,045 | 7/1984 | Norris | 358/244 |
| 4,473,849 | 9/1984 | Cool | 358/332 |

Primary Examiner—Raymond F. Cardillo
Assistant Examiner—Robert A. Weinhardt
Attorney, Agent, or Firm—William F. Noval

[57] ABSTRACT

A microprocessor control controls the operation of a color video printer to produce color photographic copies from color video images. The printer includes a monochrome cathode ray tube (CRT) and an exposure station which is located along an optical path from the CRT and at which is positioned self-processing photographic elements. A video signal circuit provides a color video signal constituting frames of interlaced odd and even fields repeated at broadcast field frequency, wherein each field includes three concurrent color component video signals respectively representing first, second and third colors of a field image. A rotatable filter has red (R), green (G), and blue (B) filters sequentially movable into the optical path. The rotation of the filter is synchronized by the microprocessor control with the field frequency of the color video signal. The microprocessor control actuates a gate connected between the video signal circuit and the CRT to expose a photographic element positioned at the exposure station to a sequence of six color field images corresponding to a full resolution color frame image. The microprocessor control also inhibits exposure of the photographic element when the filter wheel is not rotated in synchronism with the field frequency of the color video signal.

9 Claims, 7 Drawing Figures

INHIBITION OF EXPOSURE IN A VIDEO PRINTER UPON LOSS OF COLOR FILTER SYNC

CROSS-REFERENCE TO RELATED APPLICATIONS

Cross reference is made to the following applications: U.S. patent application Ser. No. 776,232, entitled COLOR VIDEO PRINTER, by Dana W. Wolcott, filed Sept. 16, 1985; U.S. patent application Ser. No. 776,233, entitled COLOR VIEWER FOR A COLOR VIDEO PRINTER, by Dana W. Wolcott, filed Sept. 16, 1985; U.S. patent application Ser. No. 776,236, entitled WHITE COMPENSATION CIRCUIT FOR A COLOR VIDEO PRINTER, by Douglas W. Constable, filed Sept. 16, 1985; and U.S. patent application Ser. No. 776,231, entitled VIDEO SIGNAL PROCESSING CIRCUIT FOR A COLOR VIDEO PRINTER, by Douglas W. Constable, filed Sept. 16, 1985.

BACKGROUND OF THE INVENTION

This invention relates in general to color video printer apparatus for producing a color photographic copy of a color video signal. More particularly, this invention relates to microprocessor control for color video printer apparatus which insures proper operation of such apparatus to minimize improper exposure, image degradation and waste of color photographic copies.

In the cross-referenced, commonly-assigned U.S. patent application Ser. No. 776,232, entitled COLOR VIDEO PRINTER, there is disclosed a color video printer for producing a color photographic copy from a color video signal. The printer includes a monochrome display device and an exposure station which is located along an optical path from the display device and at which is located self-processing photographic elements. A color filter wheel has red, green and blue filters which are sequentially movable into the optical path. A video signal circuit provides a color video signal including concurrent red, blue and green component video signals. The video signal circuit is electrically coupled to the display device by means of a selectively actuatable gate which applys to the device only one color component video signal from each field of three color component video signals. A self-processing photographic element positioned at the exposure station, is exposed to a sequence of six color field images produced by the display device and filter wheel, the six color field images constituting a full resolution color frame image having odd and even fields of each of the primary color fields. The printer also includes operator actuatable controls for adjusting the image characteristics of the color video image before making a copy of the image and a color viewer for viewing the color image.

In such a color video printer it is desirable to effect control of the operation of the printer in a simple, economical and efficient manner. It is also desirable to inhibit exposure of a photographic element when the color filter wheel is not synchronized with the field frequency of the color video signal so that improper exposure of and waste of self-processing photographic elements is prevented. It is further desirable to control such a printer so that operator controls for adjusting the characteristics of a color video image prior to copying are not usable during exposure so that exposure parameters are not changed during the exposure sequence in order to prevent image degradation and wasted photographic copies.

SUMMARY OF THE INVENTION

According to the present invention there is provided microprocessor control for a color video printer which includes (1) monochrome electronic display means for converting a video signal into an optical image; (2) an exposure station located along an optical path from said display means at which is positioned a self-processing photographic element; (3) a video signal circuit which provides a color video signal constituting frames of interlaced odd and even fields repeated at broadcast field frequency wherein each field includes three concurrent color component video signals respectively representing first, second and third primary colors of a color field image; (4) a gate which electrically couples the video signal circuit to the display means and which selectively applies to the display means only one color component signal from each field of three concurrent component signals; and (5) a rotatable filter wheel which has first, second and third primary color filters sequentially movable into the optical path.

According to an aspect of the invention, the microprocessor control means effects operation of said printer in a simple, efficient and economical manner by synchronizing the rotation of said filter wheel with the field frequency of said color video signal and by exposing a self-processing photographic element positioned at said exposure station to a sequence of six color image fields corresponding to a full resolution color frame image having odd and even fields of each of said primary color fields by selectively actuating said gate means in response to the movement of said filters into said optial path. According to an aspect of the invention, improper exposure of a photographic element is prevented by means of said microprocessor control by inhibiting exposure of the element when the color filter is not rotated in synchronism with the field frequency of the color video signal which is to be copied.

According to another aspect of the invention, the printer includes operator controls for adjusting the characteristics of the video image prior to copying and the microprocessor control inhibits operation of the controls during exposure to prevent changing of exposure parameters and resultant image degradation and wasted copies.

DESCRIPTION OF THE DRAWINGS

In the detailed description of the invention presented below, reference is made to the accompanying drawings in which like elements are numbered with like numbers.

DESCRIPTION OF THE PREFERRED EMBODIMENT

In the following description of a preferred embodiment of the color video printer including microprocessor control of the present invention, the printer will be described with respect to the processing of an NTSC color video signal which is the standard broadcast signal in the United States, Canada, Japan and other countries. It will be understood that the printer of the present invention may also be used with other broadcast standards such as the PAL and SECAM systems used in Europe and other parts of the world. In the NTSC system, a single color image is represented by a color video signal constituting a frame of two interlaced odd and even fields. Each color field signal includes luminance and chrominace components which encode three concurrent primary color component signals (red, green and blue). The color video signal is broadcast at 30 frames or 60 fields per second.

Figure 1:
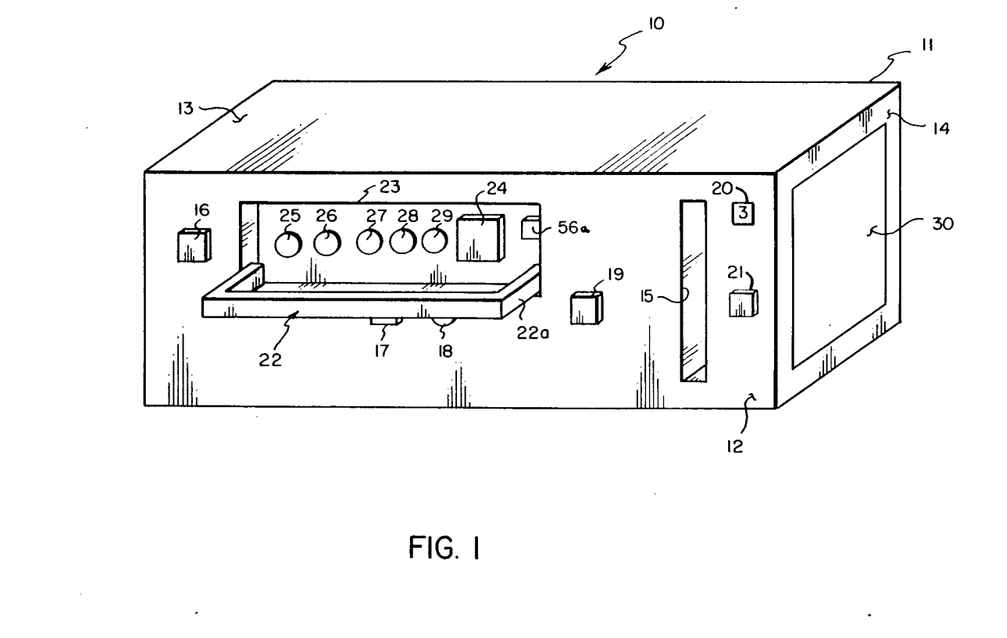
FIG. 1 is a perspective view of a color video printer including a microprocessor control according to the present invention.

Referring now to the figures, there is shown a preferred embodiment of the color video printer including microprocessor control according to the present invention. In FIG. 1, printer 10 includes a housing 11 having a front panel 12, a top panel 13, and a side panel 14 with a door 30 for inserting packs of self-processing photographic elements into printer 10. Not shown are another side panel, a bottom panel and a rear panel. Front panel 12 includes a print ejection slot 15, a "POWER" switch 16, a "PRINT" switch 17, a "READY" light 18, an "NTSC/RGB" switch 19, an "EXPOSURE NUMBER" dial 20 and a latch 21. A cover 22 with lip 22a is mounted on panel 12 and is movable between an open position (as shown in FIG. 1) and a closed position. When cover 22 is in the open position, a recessed panel 23 is accessible to an operator for viewing and adjusting an image. Panel 23 includes an image viewer 24 and adjustable controls 25, 26, 27, 28 and 29 (to be explained later).

Figure 2:
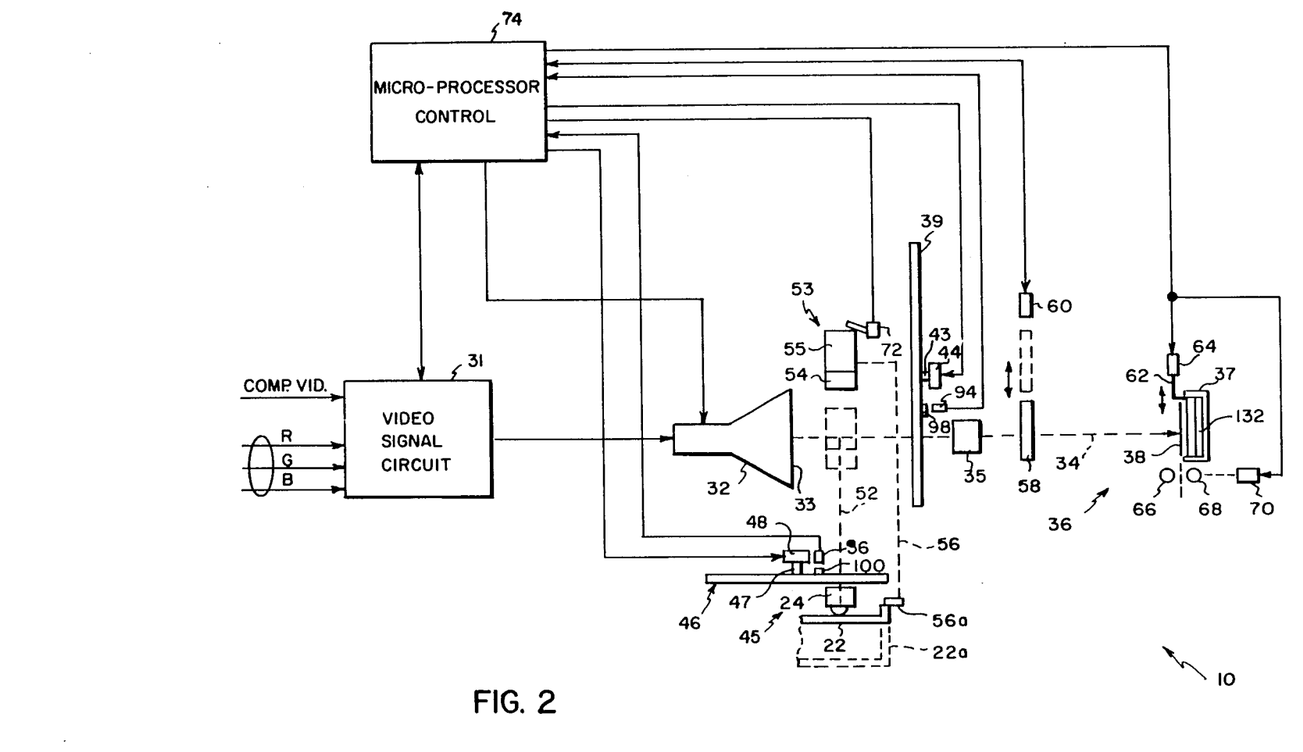
FIG. 2 is a partially schematic, partially diagrammatic view of the printer of FIG. 1.

Referring now to FIG. 2, there is shown a partially schematic, partially diagrammatic view of important components of printer 10. As shown, printer 10 includes a video signal circuit 31 which receives (by actuation of switch 19 on panel 12 in FIG. 1) either a composite color video signal having luminance and chrominance component video signals or an RGB component color video signal having three concurrent primary color signals constituting red (R), green (G), and blue (B) component video signals. The composite color video signal is illustratively described as being in the NTSC format which has a field frequency of sixty fields per second, or a frame frequency of thirty frames per second. The color video signal may be provided by a transmission source, such as broadcast, cable or satellite transmission; by a recording device such as a video cassette recorder/player, a magnetic disc player or an optical disc player; or by a program source such as a video camera.

As will be explained in greater detail with respect to FIG. 3, video signal circuit 31 processes either a composite color video signal or an RGB component color video signal to provide a repetitive sequence of RGB primary color component video signals to a monochrome electronic display device such as a monochrome cathode ray tube (CRT) 32. The applied video signal is converted to a monochrome optical image which is displayed on the screen 33 of CRT 32. An exposure station 36 is located along a first (exposure) optical path 34 from CRT 32. Positioned at station 36 is a pack 37 of unexposed self-processing photographic elements 38.

A first (exposure) color filter wheel 39 has (see FIG. 6A) a red filter 40, a green filter 41, and a blue filter 42. Filter wheel 39 is mounted for rotation on shaft 43 and is driven by a motor 44 to sequentially move filters 40, 41 and 42 into optical path 34 in synchronism with the field frequency of the color video signal. Monochrome images displayed on screen 33 of CRT 32 are filtered by filters 40, 41 and 42 to produce color images projected to station 36 by projection lens 35.

Figure 6A:
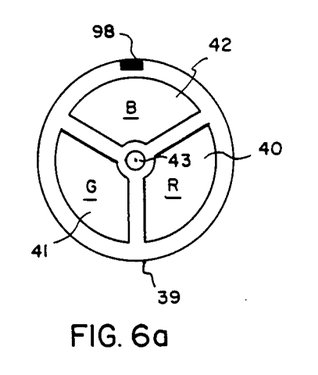
FIGS. 6A and 6B are frontal views respectively of the exposure and viewer filter wheels shown in FIG. 2.
Figure 6B:
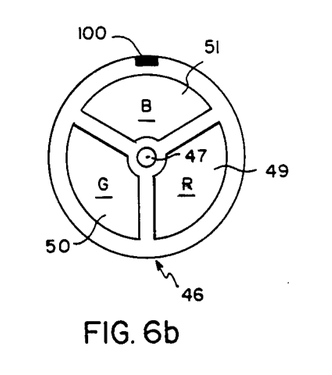

Printer 10 also has a viewing station 45 at which an operator may view an image prior to making a print. Viewing station 45 includes a second (viewer) filter wheel 46 mounted on shaft 47 and driven by motor 48. Filter wheel 46 is similar in construction to filter wheel 39 and includes respective red, green and blue filters 49, 50 and 51 (see FIG. 6B) which are sequentially movable into a second (viewer) optical path 52 from CRT 32 to viewer 24. A mirror assembly 53, which includes mirrors 54 and 55, is movable between a position (as shown in solid lines in FIG. 2) which is out of the exposure optical path 34 and a position (as shown in dashed lines in FIG. 2) intercepting optical path 34 and establishing viewer optical path 52. As noted above, cover 22 is movable between a closed position (as shown in solid lines in FIG. 2) in which the viewer 24 is covered, and an open position (as shown in dashed lines in FIG. 2), in in which the viewer 24 is covered, and an open position (as shown in dashed lines in FIG. 2), in which the viewer 24 is uncovered so that an image displayed on CRT 32 may be viewed by an operator. When cover 22 is opened, mirror assembly 53 is moved by coupling 56 into optical path 34. When cover 22 is closed, lip 22a of cover 22 contacts finger 56a of coupling 56 to move mirror assembly 53 out of optical path 34 to permit printing of the image produced by CRT 32. The construction and operation of coupling 56 and optical assembly 53 is described in greater detail in cross-referenced, copending U.S. patent application Ser. No. 776,233, entitled COLOR VIEWER FOR A COLOR VIDEO PRINTER.

Printer 10 includes a shutter 58 movable into and out of optical path 34 by means of solenoid 60. A print eject assembly includes a pusher arm 62 actuated by a solenoid 64 and a pair of processing and eject rollers 66 and 68 rotatably actuated by motor 70.

Printer 10 also includes a detector 73 for detecting when assembly 53 is out of path 34 (which indicates cover 22 is closed). Operation of printer 10 is controlled by microprocessor control 74 which includes a microprocessor (such as the INTEL 8051), programming of which is well known to those skilled in the art.

Figure 3:
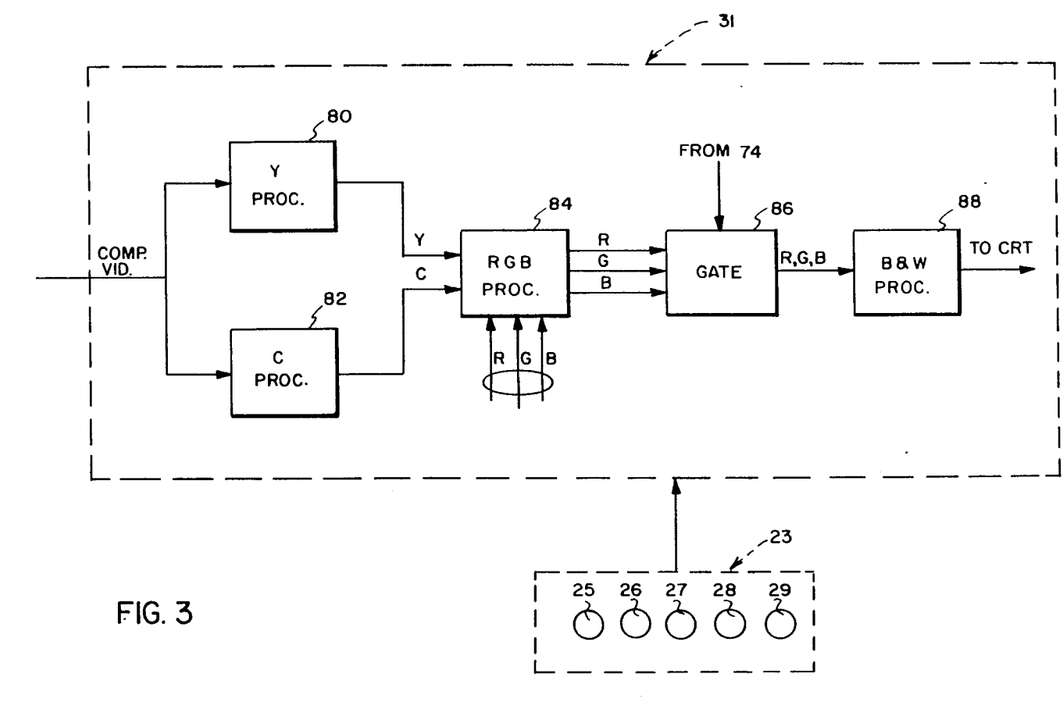
FIG. 3 is a block diagram showing in greater detail the video signal circuit shown in FIG. 2.

Video signal circuit 31 is shown in greater detail in FIG. 3. A composite color video signal received by video signal circuit 31 is applied to luminance (Y) processing circuit (Y PROC.) 80 and chrominance (C) processing circuit (C PROC.) 82. Circuits 80 and 82 respectively separate the Y and C component signals from the composite video signal. The luminance and chrominance signals are applied to RGB decode and processing circuit (RGB PROC.) 84 which decodes concurrent red (R), green (G) and blue (B) color component signals from the luminance and chrominance component signals. Circuit 84 also processes the R G B signals and applies them to gate 86. As will be described later, gate 86 is controlled by microprocessor control 74 to select one of the three concurrent R, G or B component signals applied to it. The selected color component signal is then supplied to a black and white processing circuit 88 before application to CRT 32.

The operator controls on sub-panel 23 include "COLOR" control 25 and "HUE" control 26 which respectively control the color saturation and hue of the chrominance signal processed by circuit 82; a "DETAIL" control 27 which controls the detail of the luminance signal processed by circuit 80 and respective "BLACK" and "WHITE" controls 28 and 29 which control the black and white levels of the signal processed by circuit 88 before being applied to the CRT 32.

Features of video signal circuit 31 are described in greater detail in cross-referenced, copending U.S. patent application Ser. No. 776,236, entitled WHITE COMPENSATION CIRCUIT FOR A COLOR VIDEO PRINTER and cross-referenced, copending U.S. patent application Ser. No. 776,231, entitled VIDEO SIGNAL PROCESSING CIRCUIT FOR A COLOR VIDEO PRINTER.

With reference to the flow chart of FIG. 5, control of the operation of the printer 10 according to the present invention by means of microprocessor control 74 will now be described. Actuation of switch 16 (FIG. 1) on front panel 12 turns printer 10 on (box 90). Control 74 turns on filter wheel motors 44 and 48 to rotate filter wheels 39 and 46, respectively. The rotational speed of wheels 39 and 46 is synchronized (box 92) with the field frequency of the color video signal processed by printer 10. Since the illustrative NTSC field frequency is sixty fields per second (fps) and filter wheels 39 and 46 have three color filters, each of wheels 39 and 46 are rotated at twenty (60 fps÷3 filters) revolutions per second. The rotational speed of wheels 39 and 46 are respectively sensed by detectors 94 and 96 (FIG. 2) detecting identifying marks 98 and 100 respectively on wheels 39 and 46. As will be described later, marks 98 and 100 also indicate the positioning of the red filters 40 and 49 in optical paths 34 and 52.

Control 74 also applies power to CRT 32 (box 102) to warm it up. After the CRT 32 is warmed up, a "READY" light 18 on panel 12 (FIG. 1) is tuned on (box 104) indicating to the operator that printer 10 is ready to make a photographic copy of a color video signal.

If a copy of a video signal is to be made without any adjustments to the image characteristics thereof (such as color, hue, detail, black and white levels), the operator actuates "PRINT" switch 17 on control panel 12. Microprocessor control 74 determines whether the shutter 58 is closed (box 106), whether the rotational speed of exposure filter wheel 39 is correct (diamond 108), whether viewer cover 22 is closed (diamond 110) and whether "PRINT" switch 17 has been actuated (diamond 112). If "YES", then actuation of switch 17 effects initiation of the "print" operation. If the viewer cover 22 is open, or if the speed of filter wheel 39 is not correct or if the "PRINT" switch 17 has not been actuated, then the "print" operation will be inhibited.

Upon initiation of the "print" operation, control 74 actuates solenoid 60 to move shutter 58 out of exposure optical path 34 (box 114). Microprocessor control 74 then determines whether the speed of filter wheel 39 is correct (diamond 116). When the mark 98 on filter wheel 39 has been detected by detector 94 to confirm that red filter 40 (FIG. 6A) of filter wheel 39 intercepts optical path 34, control 74 turns CRT 32 on (box 118) and actuates gate 86 (FIG. 3) of video signal circuit 31 to select the red component video signal to be applied to CRT 32. CRT 32 converts the video signal to a monochrome optical image on screen 33 which is converted to a red optical image by red filter 40 (FIG. 6A). The red optical image is projected along path 34 by lens 35 to exposure station 36 to expose a self-processing photographic element 38 positioned at station 36. As filter wheel 39 continues to rotate to move green filter 41 and blue filter 42 into optical path 34, control 74 actuates gate 86 to sequentially select the corresponding green and blue component video signals to be applied to CRT 32. This sequence is repeated for another sequence of red, green and blue fields. Thus, a photographic element 38 is exposed to six color field images in the sequence red, green, blue, red, green, blue field images (box 120).

Figure 4:
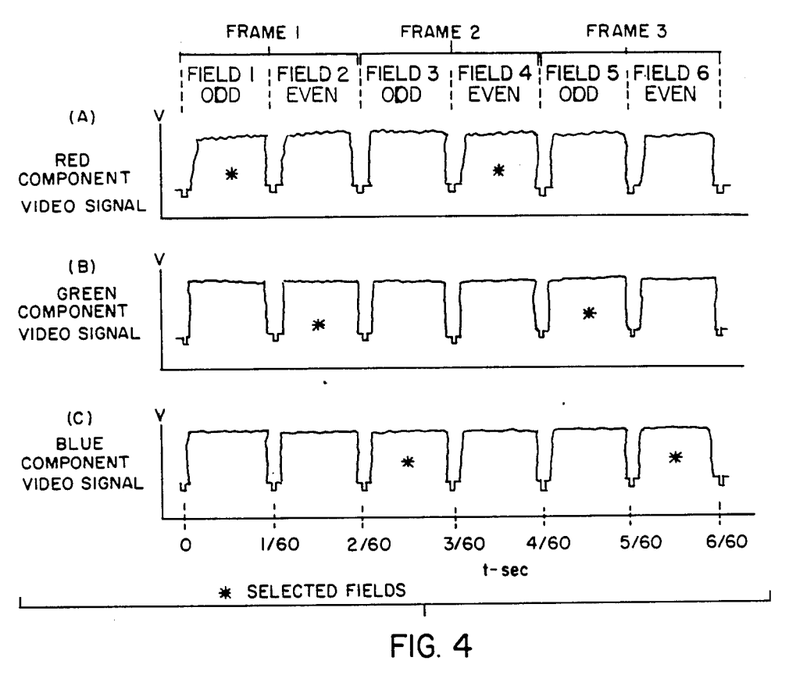
FIGS. 4A, 4B and 4C are respective video signal diagrams illustrating the operation of the printer shown in the Figures.

The sequence of exposure of element 38 is illustrated in FIG. 4. As shown, concurrent red (R), green (G) and blue (B) component video signals are applied by circuit 84 to gate 86 for a duration of three frames or six fields of color video signals. Each frame includes interlaced odd and even fields. Microprocessor control 74 is programmed to actuate gate 86 to select only one color component signal from each field of three concurrent color component signals for application to CRT 32. In FIG. 4, the selected color component signal is indicated by "*". Thus, in Field 1, the "odd" red component video signal is selected; in Field 2, the "even" green component video signal is selected, in Field 3, the "odd" blue component video signal is selected; in Field 4, the "even" red component video signal is selected, in Field 5, the "odd" green component video signal is selected; and in Field 6, the "even" blue component video signal is selected. Thus, self-processing photographic element 38 is exposed to a full resolution frame of a color video image having odd and even fields of each of red, green and blue primary colors. The exposure time of element 10 is relatively short-1/10 sec. Where the incoming color video signal represents a relatively static subject in a moving video scene, the resolution of the photographic copy is surprisingly high due to he short exposure time. Printer 10 may thus be used to make copies of television images of relatively static moving scenes.

Figure 5:
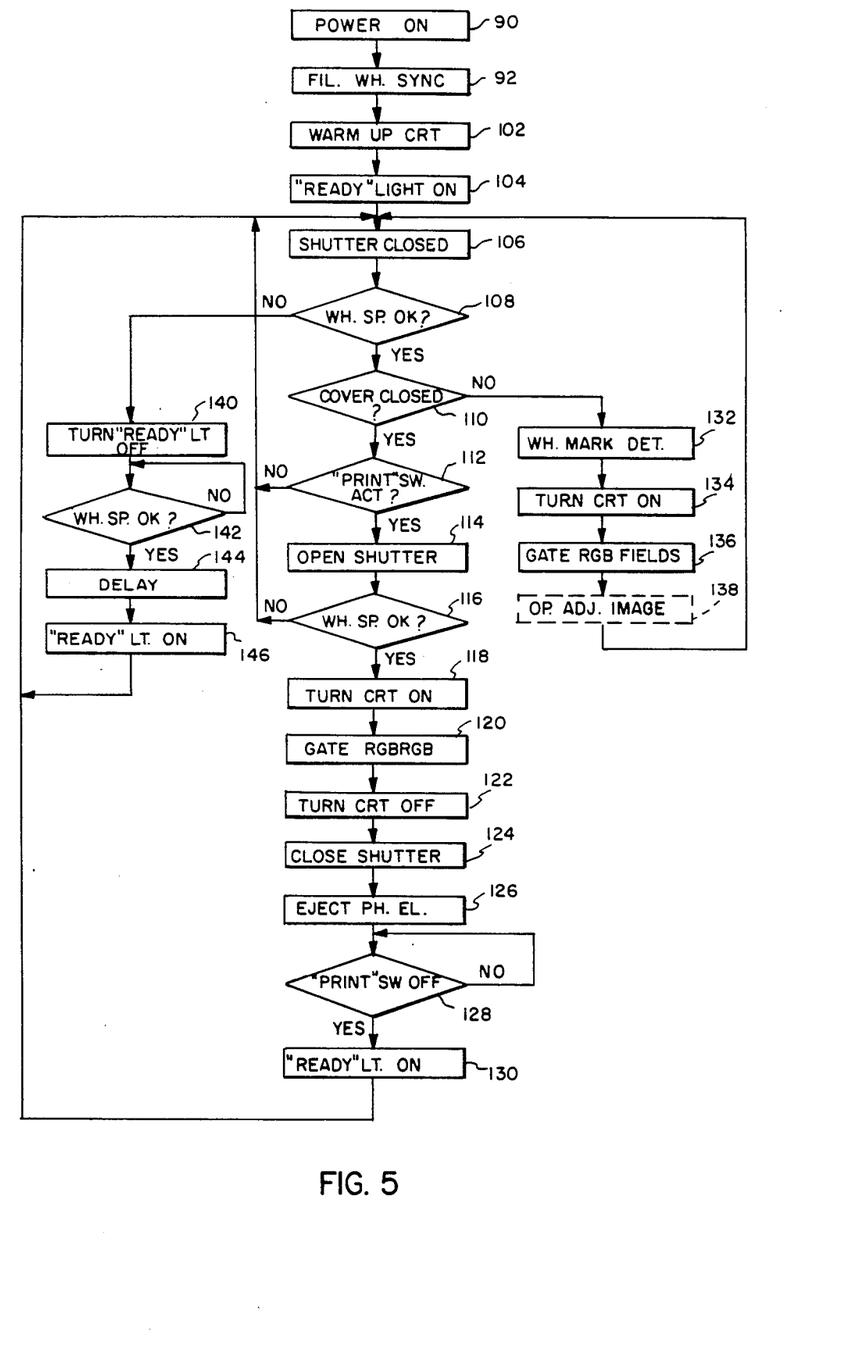
FIG. 5 is a flow chart of the operation sequence of the microprocessor control of the printer shown in the Figures.

Referring again to the flow diagram of FIG. 5, after exposure, control 74 turns off CRT 32 (box 122) and actuates solenoid 60 to close shutter 58 (box 124). Photographic element 38 is ejected from exposure station 36 (box 126) by actuation of solenoid 64 to cause pusher rod 62 to move element 38 out of pack 37 into the nip of rollers 66 and 68 (dashed lines in FIG. 2) which are rotated by motor 70. As element 38 is moved through this nip, rollers 66, 68 rupture a pod of processing chemicals made integral with element 38 and spread the chemicals uniformly over the exposed image-forming area of element 38. Element 38 self-processes to a finished photographic print outside of printer 10. A particularly exemplary photographic element which may be used in printer 10 is the "Trimprint"$^R$ instant film pack sold by the Eastman Kodak Company, Rochester, New York.

After ejection of an exposed self-processing photographic element from exposure station through slot 15 in panel 12 (FIG. 1), printer 10 is ready to make another copy. After determining whether the "PRINT" switch 17 is off (diamond 128), microprocessor control 74 turns on "READY" light 18 (box 130). Spring 132 of pack 37 urges an unexposed photographic element 38 into exposure station 36. The routine is then returned to box 106 (FIG. 5).

If the operator desires to make adjustments to the characteristics of the color image to be copied, he/she opens cover 22 to gain access to viewer 24 and image controls 25-29 (FIG. 1). Optical assembly 53 is moved into optical path 34 by coupling 56 to establish viewing optical path 52 to viewer 24 (FIG. 2). Microprocessor control 74 executes the sub-routine which branches to the right (FIG. 5) of diamond 110. After detecting red filter mark 100 of the viewer filter wheel 46 (box 132), microprocessor control 74 turns on CRT 32 (box 134) and actuates gate 86 to gate through to CRT 32, repetitive sequences of red, green and blue component video signals (box 136). Since viewer filter wheel 46 is synchronized with the field frequency of the incoming color video signal, the operator views the same color image that a photographic element 38 will be exposed to. By adjusting (box 138) controls 25-29 on panel 12 (FIG. 1) the operator can change the color, hue, detail, black and white level characteristics of the color video image to be copied.

After the adjustments have been completed or if no adjustments are made, the operator closes cover 22 to move optical assembly 53 out of the exposure optical path 34. The routine of microprocessor control 74 is returned to box 106 and exposure of a photographic element may then be effected.

If it is determined at diamond 108 (FIG. 5) that the rotational speed of filter wheel 39 is not correct, control 74 executes the subroutine branching to the left. After the "READY" light 18 is turned off (box 140), microprocessor control 74 again determines whether the speed of wheel 39 is correct (diamond 142). When the speed is determined to be correct, after a delay (box 144), the "READY" light 18 is turned on (box 146) and the routine is returned to box 106.

It will be appreciated that although a particular sequence (viz., RGB) of exposure of a photographic element to primary color field images has been described above, other exposure sequences (e.g., RBG, GBR, etc.) may be effected as long as the element is exposed to a full frame of a color video signal constituting odd and even fields of three primary color component video signals. It will also be appreciated that primary colors other than red, green and blue may be used in the practice of the present invention but that red, green and blue are the predominant primary color component signals used in present day television signal standards. Moreover, color filter wheels 39 and 46 may comprise a rotatable drum or include more than one set of filters, in which case the speed of rotation of the wheels would be changed accordingly. For example, if each of wheels 39 and 46 had two sets of red, green and blue filters, the speed of rotation of the filters would be ten revolutions per second so that the number of filters per second moved into the optical paths still equaled the field rate of the color video signal.

The invention has been described in detail with particular reference to a preferred embodiment thereof, but it will be understood that variations and modifications can be effected within the spirit and scope of the invention.

What is claimed is:

1. Apparatus for producing a color photographic copy of a color video signal comprising:

monochrome electronic display means for displaying an image of a video signal;

an exposure station located along a first optical path from said display means at which is positioned a photographic element;

video signal circuit means for providing a color video signal constituting frames of interlaced odd and even fields repeated at broadcast field frequency, wherein each field includes three concurrent color component video signals respectively representing first, second and third primary colors of a color field image;

selectively actuatable gate means, electrically coupling said circuit means to said display means, for applying to said display means only one color component signal from each field of said three concurrent color component signals provided by said circuit means;

a first rotatable filter having first, second and third primary color filters sequentially movable into said optical path;

first means for continuously rotating said first filter;

control means including a microprocessor (1) for synchronizing the continuous rotation of said first filter by said first rotating means with said field frequency of said color video signal; (2) for exposing a photographic element positioned at said exposure station by actuating said gate means in response to detection of said first primary color filter being moved into said first optical path to apply to said electronic display means a sequence of six consecutive color component video field signals constituting odd and even fields respectively of each of said first, second and third primary colors, in the color sequence of first primary color, second primary color, third primary color, first primary color, second primary color, third primary color, as respective corresponding color filters of said first filter are sequentially rotated into said optical path, such that said display means produces a sequence of six consecutive monochrome field images which are filtered by respective corresponding primary color filters to expose said element to a sequence of six color field images corresponding a full frame of a color video image; and (3) for inhibiting the exposure of said photographic element when said first filter is not rotated in synchronism with said field frequency of said video signal.

2. The apparatus of claim 1 wherein said video signal circuit means provides a color video signal having a field frequency of 60 fields per second; wherein said first filter rotating means rotates said first filter at 20 revolutions per second; and wherein said control means exposes said self-processing photographic element for 1/10 of a second equivalent to six consecutive color field image periods.

3. The apparatus of claim 1 wherein said first filter includes means for identifying the position of said first primary color filter and including detecting means for detecting said identifying means and for transmitting a signal to said control means indicating that said primary color filter is in said first optical path and wherein said control means actuates said gate means in response to said signal to expose said photographic element.

4. The apparatus of claim 1 including a shutter which is located adjacent to said exposure station, and which is movable into and out of said first optical path; and wherein said control means (1) moves said shutter out of said first optical path before exposure of said photographic element; (2) moves said shutter back into said first optical path after exposure of said photographic element; and (3) inhibits movement of said shutter out of said first optical path when said first filter is not rotated by said rotating means at a rotational speed in synchronism with said field frequency of said video signal.

5. The apparatus of claim 1 including an image viewer; an optical assembly movable between a position out of said first optical path and a position intercepting said first optical path to establish a second optical path between said display means and said image viewer; a second rotatable filter having first, second and third primary color filters sequentially movable into said second optical path; means for continuously rotating said second filter in synchronism with the field frequency of said color video signal; optical assembly detecting means for detecting when said optical assembly is at said position out of said first optical path; and wherein said control means inhibits exposure of said photographic element when said optical assembly detecting means does not detect that said optical assembly is at said position out of said first optical path.

6. The apparatus of claim 5 including a cover; means for mounting said cover for movement between a closed position in which said image viewer is covered and an open position in which said image viewer is uncovered and means for coupling said cover to said optical assembly such that (1) when said cover is in said closed position, said optical assembly has been moved by said coupling means to said position out of said first optical path to permit exposure of said photographic element and (2) when said cover is in said open position, said optical assembly has been moved by said coupling means to said position intercepting said first optical path to permit viewing of a color image at said image viewer such that said control means inhibits exposure of a photographic element at said exposure station.

7. The apparatus of claim 6 including operator adjustable image controls located adjacent to said image viewer and wherein, when said cover is in said closed position, said image controls are not accessible to an operator and when said cover is in said open position, said controls are accessible to an operator.

8. The apparatus of claim 1 including means for ejecting a self-processing photographic element from said exposure station and wherein said control means actuates said ejecting means subsequent to completion of exposure of said photographic element.

9. The apparatus of claim 8 wherein said ejecting means includes a pair of processing rollers forming a nip through which said element is passed to initiate processing of said exposed self-processing photographic element.

* * * * *